3,019,166
ANTIPHLOGISTIC AND CHOLERETIC COMPOSITIONS AND PROCESS OF THERAPEUTICALLY USING SAME
Hugo Zellner, Linz (Danube)-Ebelsberg, Austria, assignor to Byk-Gulden Lomberg Chemische Fabrik G.m.b.H., Konstanz (Bodensee), Germany, a corporation of Germany
No Drawing. Filed May 26, 1958, Ser. No. 737,543
6 Claims. (Cl. 167—65)

The present invention relates to valuable antiphlogistic and choleretic compositions and, more particularly, to compositions containing α-naphthyl acetic acid as antiphlogistic and choleretic agent and to a process of therapeutically using such compositions.

It is one object of the present invention to provide valuable antiphlogistic and choleretic compositions which are useful in therapy as choleretic agents or, as antiphlogistic agents, in the treatment of inflammatory diseases.

Another object of the present invention is to provide a process of using such compositions in therapy in suppressing inflammation and/or as choleretic agent.

Other objects of the present invention and advantageous features thereof will become apparent as the description proceeds.

In principle, the compositions according to the present invention contain, as active anti-inflammatory and choleretic agent, α-naphthyl acetic acid and salts of said acid with pharmaceutically acceptable inorganic and organic bases, such as the sodium, potassium, ethylene diamine, ammonium diethanol amine, triethanol amine, diethanolamino ethanol, and the like salts.

The salts of α-naphthyl acetic acid and especially the sodium, diethanol amine, triethanol amine salts, and the diethanol amino ethanol salt, form readily water-soluble, stable complex salts with amino pyrine (4-dimethylamino-1,5-dimethyl-2-phenyl-3-pyrazolone), antipyrine (1,5-dimethyl-2-phenyl-3-pyrazolone), isopropyl antipyrine, isopropyl amino antipyrine, and other antipyretic-analgetic pyrazolone compounds. Said complex compounds contain the components in molar proportion. They are useful for oral as well as parenteral application.

Pharmacological tests have shown that the choleretic activity of α-naphthyl acetic acid and its salts is quite pronounced and is considerably higher than the choleretic activity of compounds which are known and used in therapy for their choleretic activity, such as dehydrocholic acid, and that their choleretic activity persists over a prolonged period of time.

Tests were carried out with 32 male albino rats having a weight between 20 g. and 370 g. After narcotization by means of urethane (1 g./kg. body weight of the animal) and opening of the peritoneal cavity, a cannula was introduced into the ductus choledochus shortly before entering the duodenum in order to collect the produced bile liquid. Thereafter, the abdominal cavity was closed. The bile produced within 15 minutes was collected and weighed. The solutions to be vested were administered intravenously by means of a cannula connected with the vena jugularis or intramuscularly by injection into the thigh, or orally through an esophageal cannula into the stomach or by direct injection into the stomach. The test solution contained the sodium salt of α-naphthyl acetic acid in 1% saline solution. The choleretic activity of this compound was compared with that of the sodium salt of dehydrocholic acid.

On an average, the lowest dosis showing a choleretic effect is about 10 mg./kg. The sodium salt of dehydrocholic acid has only a very weak choleretic activity when administered in about the same dose. When using a dose of 20 mg./kg., bile secretion is increased by about 30% and for about 1½ hours. By intravenously injecting 100 mg./kg. of the sodium salt of α-naphtyl acetic acid, the increase in bile secretion is almost 200% and the choleretic effect persists for about 3 hours. Higher doses do not not cause a further increase.

On intramuscular administration, the choleretic effect is somewhat lower but persists for an even more prolonged period of time. The total amount of bile produced is about the same as that produced by intravenous injection.

When administering 100 mg. orally, the increase in bile secretion amounts to about 30% which maximum value is obtained about 30 minutes after administration. In contrast to intravenous administration, the choleretic effects persist over a more prolonged period of time and decrease only very gradually. 2 hours after oral administration the bile production is still about 20% higher than before administration. In contrast thereto, the sodium salt of dehydrocholic acid has not only a lower choleretic effect but said effect lasts also only for a considerably shorter period of time. In general, the sodium salt of α-naphthyl acetic acid is about 1½–2 times more effective than the sodium salt of dehydrocholic acid.

The compositions according to the present application, furthermore, have a remarkable antiphlogistic and anti-inflammatory activity. The following pharmacological tests have proved such an activity.

Edemas were produced by injecting 0.1 cc. of a 1% formaldehyde solution into the dorsal part of the hindpaw of female albino rats of the Glaxo breed. The activity of the compound to be tested was determined by measuring the swelling of the paw according to the method described in Courvoisier and Ducrot, "Arch. int. Pharmacodyn.," vol. 102, page 33 (1955), by means of a thickness gauge of the type J50 (manufacturer: Schaefer, Schwenningen (Germany)), and is given in percent reduction of the swelling of the paw of animals not treated with α-naphtyl acetic acid. α-Naphthyl acetic acid is administered subcutaneously in a 1% aqueous solution of its sodium salt 30 minutes before and 1 hour after the injection of the formaldehyde solution and in varying amounts of 2 x 50 mg./kg.=100 mk./kg., 2 x 25 mg./kg.=50 mg./kg., and 2 x 12.5 mg./kg.=25 mg./kg. The control animals receive at the same time the corresponding amounts of an isotonic sodium chloride solution. The results of these tests are given in the following table:

| Dose | Swelling determined after— | | | | | | | | |
|---|---|---|---|---|---|---|---|---|---|
| | 30 min. | 60 min. | 90 min. | 2 hours | 3 hours | 4 hours | 5 hours | 8 hours | 24 hours |
| 100 mg./kg | Percent 44 | Percent 52 | Percent 50 | Percent 56 | Percent 60 | Percent 57 | Percent 62 | Percent 54 | Percent 33 |
| 50 mg./kg | 35 | 30 | 27 | 22 | 23 | 12 | 18 | 10 | |
| 25 mg./kg | 33 | 28 | 15 | | | | | | |

The toxicity of α-naphthyl acetic acid is remarkably low. The $LD_{50}$ on oral administration to mice is about 750 mg./kg.

Clinical administration of a dose as high as 5 g. of α-naphthyl acetic acid per day did not produce any untoward side-effects and was well tolerated. The usual dose is between 150–200 mg. and 300–400 mg. of α-naphthyl acetic acid given three times daily, which dose is sufficient to produce satisfactory Cholepoiesis.

It is evident from the above given table that the antiphlogistic activity of α-naphthyl acetic acid is dependent on the administered dose. A dose of 100 mg./kg. of the sodium salt of α-naphthyl acetic acid exerts, even after 24 hours, an extraordinary high antiphlogistic effect and inhibits the formaldehyde-induced edema by 33%. The maximum inhibitory effect is reached after 3 hours or, respectively, 5 hours and amounts to 60% or, respectively 62%. The maximum inhibitory effect of a dose of 50 mg./kg. is observed after 30 minutes and amounts to 35%. Its intensity gradually decreases and has disappeared after about 8 hours. With a dose of 25 mg./kg. the maximum effect is attained after 30 minutes and amounts also to about 33%. The inhibitory effect rapidly decreases with such a low dose and completely disappears after 2 hours.

When inducing edema in the paw of the same animal by injection of 0.2 cc. of a hyaluronidase preparation containing 5 viscosity units, the sodium salt of α-naphthyl acetic acid shows, on subcutaneous administration of 50 mg./kg. 30 minutes before and of further 50 mg./kg. 1 hour after hyaluronidase application, initially an edema slightly increasing effect which, however, after about 1 hour changes to a considerable inhibitory effect persisting for at least 8 hours.

The edema-inhibitory effect of α-naphthyl acetic acid is quite surprising and renders said compound therapeutically useful. In contrast to the related β-naphthyl acetic acid and its salts, the α-naphthyl acetic acid has a pronounced inhibitory effect not only upon the formaldehyde-induced edema, but also upon the hyaluronidase-induced edema. β-Naphthyl acetic acid is substantially ineffective against the formaldehyde-induced edema.

As is known, formaldehyde, in contrast to hyaluronidase, causes a more chronic inflammation; α-naphthyl acetic acid, thus, is especially suitable in the treatment of chronic inflammations.

The valuable compositions according to the present invention are administered orally in the solid state in the form of tablets, dragees, capsules, or the like shaped preparations, or in the form of solutions, emulsions, suspensions, or as suppositories. They may also be administered by intravenous injection in the form of aqueous solutions.

Preferably α-naphthyl acetic acid and its salts are not used in their original form but diluted, thus allowing better and more economic use to be made thereof.

In the case of powders, a fine dispersion of the active compound is of importance. Such a fine dispersion can be achieved, for instance, by intimately mixing or milling the compound in a ball mill with a solid, pulverulent extending agent to the desired degree of fineness, or by impregnating the already milled, finely powdered, solid carrier with a mixture of the active compound in water or any other suitable solvent and then removing the water or solvent.

When preparing tablets, dragees, pills, and the like shaped preparations to be used in human therapy, commonly used diluting agents, binders, lubricants, and other tableting adjuvants are employed, such as sugar, lactose, talc, starch, bolus alba; as binders, pectin, gelatin, gum arabic, methyl cellulose, yeast extract, agar, tragacanth; and as lubricants stearic acid, magnesium stearate, and others.

The content of the active compound in such preparations may vary. It is, of course, necessary that the active compound be present in such an amount that a suitable dosage will be ensured. Ordinarily the preparation should not contain less than 5% of the active compound calculated for the free acid. The preferred amount of the active compound is between 33% and 50% of the preparation. Tablets containing, for instance, between about 75 mg. and about 500 mg. and preferably about 150 mg. per tablet of the active compound, calculated as free acid, have proved to be especially suitable.

The following examples of compositions containing α-naphthyl acetic acid and its salts as they are used in therapy serve to illustrate the present invention without, however, limiting the same thereto.

*Example 1*

150 mg. of α-naphthyl acetic acid, 5 mg. of finely divided silica sold under the trademark "Aerosil," 3 mg. of magnesium stearate, 76 mg. of lactose, and 66 mg. of starch are intimately mixed. The resulting mixture is pressed into kernels weighing 0.3 g. which are coated with a layer of sugar in order to obtain dragees weighing 0.5 g.

*Example 2*

150 mg. of α-naphthyl acetic acid, 3 mg. of magnesium stearate, 8 mg. of cocoa butter, 4 mg. of gum arabic, 20 mg. of glucose, 95 mg. of lactose, and 70 mg. of starch are compounded in the usual manner, granulated, and pressed to tablets weighing 350 mg.

*Example 3*

300 g. of α-naphthyl acetic acid are neutralized by adding drop by drop a 30% aqueous triethanol amine solution. The pH-value of the solution is adjusted to a pH of 7.5 by determining the pH-value by means of a glass electrode. After the addition of 30 g. of finely divided silica (trademark "Aerosil") with stirring, the mixture is added, while stirring, to 2,000 g. of a molten suppository base of the type "Imhausen." After homogenization, the mixture is poured into suppository molds. The weight of the resulting suppositories is 3.05 g., each containing 300 mg. of α-naphthyl acetic acid. The "Imhausen"-mass is a derivative of sperm oil.

*Example 4*

150 mg. of α-naphthyl acetic acid are mixed with 25 mg. of beeswax, 5 mg. of lecithin, 120 mg. of hydrogenated sperm oil, and 200 mg. of peanut oil to yield a flowable paste. The paste is filled into gelatin capsules by means of a filling device.

*Example 5*

279 g. of α-naphthyl acetic acid are dissolved in a solution of 176 g. of diethylamino ethanol in 4 l. of distilled water. The solution is adjusted to a volume of 5 l. and filled into ampoules of 5 cc. The ampoules are sterilized in an autoclave at 115° C. Each ampoule contains about 279 mg. of α-naphthyl acetic acid or 455 mg. of its diethanol amino ethanol salt.

*Example 6*

5 g. of α-naphthyl acetic acid are suspended in 50 cc. of distilled water and neutralized with N sodium hydroxide solution. About 26.9 cc. of the sodium hydroxide solution are necessary for neutralization. The volume of the solution is brought to 100 cc. 5 cc. of said solution, i.e., a teaspoonful contains about 250 mg. of α-naphthyl acetic acid.

*Example 7*

186 g. of α-naphthyl acetic acid are suspended in 250 cc. of water at a temperature of 50–60° C. 84 g. of sodium bicarbonate are added thereto while stirring. 231 g. of amino pyrine are added while stirring. The resulting clear solution is concentrated to yield the molecular compound of the formula

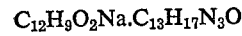

$$C_{12}H_9O_2Na \cdot C_{13}H_{17}N_3O$$

Said compound is either worked up to tablets, dragees, and the like solid shaped preparations in the same manner as described hereinabove in Examples 1 and 2 or is converted into injectable solutions as described in Example 5. It is, of course, also possible to prepare other compositions, orally or parenterally administrable, or suppositories of such a molecular compound.

Molecular compounds of the sodium or other salts of α-naphthyl acetic acid can be prepared in about the same manner as described in Example 7 with other antipyretic-analgetic pyrazolone compounds as mentioned hereinabove. It is evident that such molecular compounds are of considerable therapeutic value since they combine the anti-inflammatory effect of α-naphthyl acetic acid with the antipyretic and analgesic effect of the pyrazolone derivatives. Successful clinical trials have been made with these compositions in treatment of cholecystitis, cholangitis, cholelythiasis, some types of hepatitis and chronic hepatopathies, meteorism, and also rheumatic disorders.

I claim:

1. The process of inhibiting inflammation and causing increased cholepoiesis, said process consisting in administering to patients with decreased cholepoiesis a compound selected from the group consisting of α-naphthyl acetic acid, its salts with pharmaceutically acceptable bases, and the molecular compounds of salts of said α-naphthyl acetic acid with antipyretic-analgetic pyrazolone bases.

2. The process of inhibiting inflammation and causing increased cholepoiesis, said process consisting in administering to patients with decreased cholepoiesis α-naphthyl acetic acid.

3. The process of inhibiting inflammation and causing increased cholepoiesis, said process consisting in administering to patients with decreased cholepoiesis the lower alkanolamine salt of α-naphthyl acetic acid.

4. The process of inhibiting inflammation and causing increased cholepoiesis, said process consisting in administering to patients with decreased cholepoiesis the sodium salt of α-naphthyl acetic acid.

5. The process of inhibiting inflammation and causing increased cholepoiesis, said process consisting in administering to patients with decreased cholepoiesis the molecular compound of the sodium salt of α-naphthyl acetic acid and aminopyrine.

6. A choleretic and antiphlogistic composition in dosage unit form for administration to patients with decreased cholepoiesis, the essential active constituent thereof being selected from the group consisting of α-naphthyl acetic acid, its salts with pharmaceutically acceptable bases, and the molecular compounds of salts of said α-naphthyl acetic acid with antipyretic-analgetic pyrazolone bases, the said essential active constituent being combined with a vehicle therefor and the said dosage form being selected from the group consisting of oral, parenteral, and rectal dosage forms, each dosage unit containing between about 75 mg. and about 500 mg. of the essential active constituent, calculated as free α-naphthyl acetic acid.

References Cited in the file of this patent

UNITED STATES PATENTS

| | | |
|---|---|---|
| 569,415 | Hinsberg | Oct. 13, 1896 |
| 1,894,666 | Christiansen | Jan. 17, 1933 |
| 1,898,002 | Christiansen | Feb. 21, 1933 |
| 2,278,499 | Smith et al. | Apr. 7, 1942 |
| 2,323,193 | Boie | June 29, 1943 |
| 2,542,481 | Crandall | Feb. 20, 1951 |
| 2,906,666 | Wirth | Sept. 29, 1959 |
| 2,929,763 | Wettstein | Mar. 22, 1960 |

OTHER REFERENCES

Chabrol et al.: C. R. Soc. Biol., 1930, vol. 103, pp. 3–5; 1931; vol. 107, pp. 1240–1244.

Gunter et al.: Journ. Pharmacol. Exp. Therap., 1950, vol. 99, pp. 465–478.